United States Patent
Nelson (10) Patent No.: US 9,840,322 B2
(45) Date of Patent: Dec. 12, 2017

(54) ACTIVE SEMI-LEVERED LANDING GEAR

(71) Applicant: The Boeing Company, Chicago, IL (US)

(72) Inventor: Eric Howard Nelson, Bothell, WA (US)

(73) Assignee: The Boeing Company, Chicago, IL (US)

(*) Notice: Subject to any disclaimer, the term of this patent is extended or adjusted under 35 U.S.C. 154(b) by 903 days.

(21) Appl. No.: 13/901,159

(22) Filed: May 23, 2013

(65) Prior Publication Data

US 2014/0346273 A1    Nov. 27, 2014

(51) Int. Cl.
*B64D 1/12* (2006.01)
*B64C 25/22* (2006.01)
*B64C 25/34* (2006.01)
*B64C 25/60* (2006.01)

(52) U.S. Cl.
CPC .............. *B64C 25/22* (2013.01); *B64C 25/34* (2013.01); *B64C 25/60* (2013.01)

(58) Field of Classification Search
CPC ... B64C 2025/008; B64C 25/22; B64C 25/60; B64C 25/34
See application file for complete search history.

(56) References Cited

U.S. PATENT DOCUMENTS

| | | | | |
|---|---|---|---|---|
| 2,735,634 A | * | 2/1956 | Fosness | B64C 25/001 244/102 SS |
| 3,653,682 A | * | 4/1972 | Palmer | B60G 13/06 267/64.26 |
| 4,381,857 A | * | 5/1983 | Cook | F16F 9/063 188/317 |
| 6,120,009 A | * | 9/2000 | Gatehouse | B64C 25/60 267/64.11 |
| 6,345,564 B1 | | 2/2002 | Kilner et al. | |
| 8,276,843 B2 | * | 10/2012 | Wilby | B64C 25/22 244/102 A |
| 8,459,590 B2 | * | 6/2013 | DeVlieg | B64C 25/001 244/102 SS |

(Continued)

FOREIGN PATENT DOCUMENTS

CN    2642673 Y    9/2004
CN    101371102 A    2/2009

(Continued)

OTHER PUBLICATIONS

Extended European Search Report dated Oct. 16, 2014 from EP Application No. 14165918.5.

(Continued)

*Primary Examiner* — Philip J Bonzell
(74) *Attorney, Agent, or Firm* — Miller, Matthias & Hull LLP (57) ABSTRACT

An active oleo system for an aircraft semi-levered landing gear system disclosed herein includes a main strut, an auxiliary strut, bogie beam, and a pressure boost mechanism. During a takeoff roll phase, the pressure boost mechanism may increase the pressure in the main strut, forcing the main strut piston to the fully extended length. Thru the action of main strut, auxiliary strut, and bogie beam this may increase the height of the aircraft above ground, providing for a larger achievable rotation angle of the aircraft.

20 Claims, 9 Drawing Sheets

(56) References Cited

U.S. PATENT DOCUMENTS

| | | | |
|---|---|---|---|
| 8,727,274 B2 | 5/2014 | Sorin | |
| 2010/0116931 A1 | 5/2010 | Wilby | |
| 2013/0119196 A1 | 5/2013 | Lindahl et al. | |
| 2013/0181090 A1* | 7/2013 | Martinez Elkington | ............... B64C 25/58 244/100 R |

FOREIGN PATENT DOCUMENTS

| | | |
|---|---|---|
| CN | 102530243 A | 7/2012 |
| CN | 202442845 U | 9/2012 |
| CN | 102979473 A | 3/2013 |
| EP | 2 383 182 | 11/2011 |
| EP | 2 455 283 | 5/2012 |

OTHER PUBLICATIONS

Office Action for related Chinese Application No. CN201410220682.7; report dated Apr. 5, 2017.

\* cited by examiner

ACTIVE SEMI-LEVERED LANDING GEAR

BACKGROUND

During the takeoff phase of a typical large aircraft with a tricycle landing gear, a pilot will manipulate the flight controls of the aircraft to cause the aircraft to rotate. During rotation, the aircraft pivots around the axis of its main landing gear truck, causing the nose of the aircraft to pitch up while the tail of the aircraft moves toward the ground. The aircraft will rotate about the axis until, preferably, the aircraft is at the correct rotation angle for the given aircraft design and takeoff conditions. The maximum rotation angle for any given aircraft design is limited by the distance between a portion of the aircraft under the fuselage tail section and the ground during the aircraft rotation.

Aircraft manufacturers have designed various types of landing gear to increase the distance between a portion of the aircraft under the fuselage tail section and the ground to provide a larger rotation angle. An example is a semi-levered landing gear (SLG). Conventional SLGs include a bogie beam and a main strut pivotally connected to the bogie beam to form a wheel truck. The bogie beam typically includes a forward set of wheels and an aft set of wheels, and may contain additional sets of wheels in between the forward and aft sets. The forward set of wheels and aft set of wheels are attached to opposing, distal ends of the bogie beam. A lower portion of the main strut (landing gear shock strut) is attached to a central position of the bogie beam. An auxiliary strut is also attached to the upper portion of the main strut and to the bogie beam at a position proximate to the forward set of wheels. The auxiliary strut is used in conjunction with the main strut to rotate the bogie beam about an axis at the central position.

In a typical SLG, the main strut includes a piston and oleo-pneumatic (oil-air) chamber that, when charged with a pressurized gas, will cause a main strut piston to extend and increase the length of the main strut. This main (shock) strut serves to dampen, or reduce, acceleration between the bogie beam and aircraft to reduce loads into the aircraft as well as improve comfort for people onboard the aircraft.

An advantage of a conventional SLG is that during takeoff, an aircraft using an SLG can have an increased rotation angle through the interaction of the bogie beam and the struts. As an aircraft forward speed increases, the wings will begin to lift the aircraft and the landing gear shock strut will extend. With a SLG system, the auxiliary strut does not extend as the main strut extends. This action has the effect of rotating the bogie beam about the central pivot point such that the forward set of wheels is higher than the aft set of wheels, thereby increasing the height of the aircraft and allowing greater aircraft rotation. Further, during the rotation phase of takeoff, the aircraft will rotate about an axis of the set of aft wheels rather than a central point of the bogie beam where the main strut is located. Moving the center of rotation aft also allows the aircraft to increase rotation angle.

While providing an increased level of takeoff performance over other types of landing gears, if not designed properly, SLGs can decrease landing performance. The reduction in landing performance can be attributed to an additional force acting on the main strut causing the main strut to compress and therefore lower the height of the aircraft. With the conventional SLG system, the level of oleo pre-charge pressure may be increased to minimize the shock strut compression. The increased oleo pre-charge can result in a compromise between takeoff and landing performance.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect of the disclosure herein, an active semi-levered landing gear for use in an aircraft is provided. The active semi-levered landing gear may include a main strut attached to a bogie beam. The main strut may include a main strut oleo-pneumatic chamber having a chamber pressure and a main strut piston. The active semi-levered landing gear may also include a pressure boost mechanism. The oleo-pneumatic chamber may contain a fluid that comprises a gas and a fluid. The pressure boost mechanism may include a first fluid portion having a first fluid portion pressure, and a second fluid portion having a second fluid portion pressure. The first fluid portion may be selectively coupled with the fluid of the main strut oleo-pneumatic chamber. An increase in the second fluid portion pressure may increase the first fluid portion pressure. An increase in the first fluid portion pressure may increase the chamber pressure of the main strut to move the piston to an extended length to provide a longer main strut and an increased aircraft height above ground during a takeoff phase of operation.

According to another aspect of the disclosure herein, a method for providing an active semi-levered landing gear in an aircraft is provided. The method may include receiving an input that the aircraft is in a takeoff roll phase, increasing a pressure in a first fluid portion of a pressure boost mechanism by increasing a pressure in a second fluid portion of the pressure boost mechanism, and extending a main strut piston to an extended position by fluidically transferring the increase in pressure in the first fluid portion to a main strut oleo-pneumatic chamber.

According to yet another aspect of the disclosure herein, a pressure apparatus for use in a semi-levered landing gear is provided. The pressure apparatus may include a main strut apparatus, which may include a main strut oleo-pneumatic chamber and a main strut piston. The pressure apparatus may also include a pressure boost mechanism selectively coupled to the main strut oleo-pneumatic chamber. The pressure boost mechanism may include a first fluid portion and a second fluid portion. The pressure apparatus may further include a controller for selectively coupling the main strut apparatus to the pressure boost mechanism. When the pressure boost mechanism is coupled to the main strut oleo-pneumatic chamber, an increase in a pressure in the second fluid portion may cause an increase in pressure in the first fluid portion and main strut oleo-pneumatic chamber, forcing the main strut piston to extend to an extended length. When the pressure boost mechanism is decoupled from the main strut and a vent valve is opened, a decrease in a pressure in the second fluid may cause a decrease in the pressure in the first fluid and main strut oleo-pneumatic chamber.

The features, functions, and advantages discussed herein can be achieved independently in various embodiments of the presently disclosed subject matter or may be combined in yet other embodiments, further details of which can be seen with reference to the following description and drawings.

DETAILED DESCRIPTION

Figure 1A:
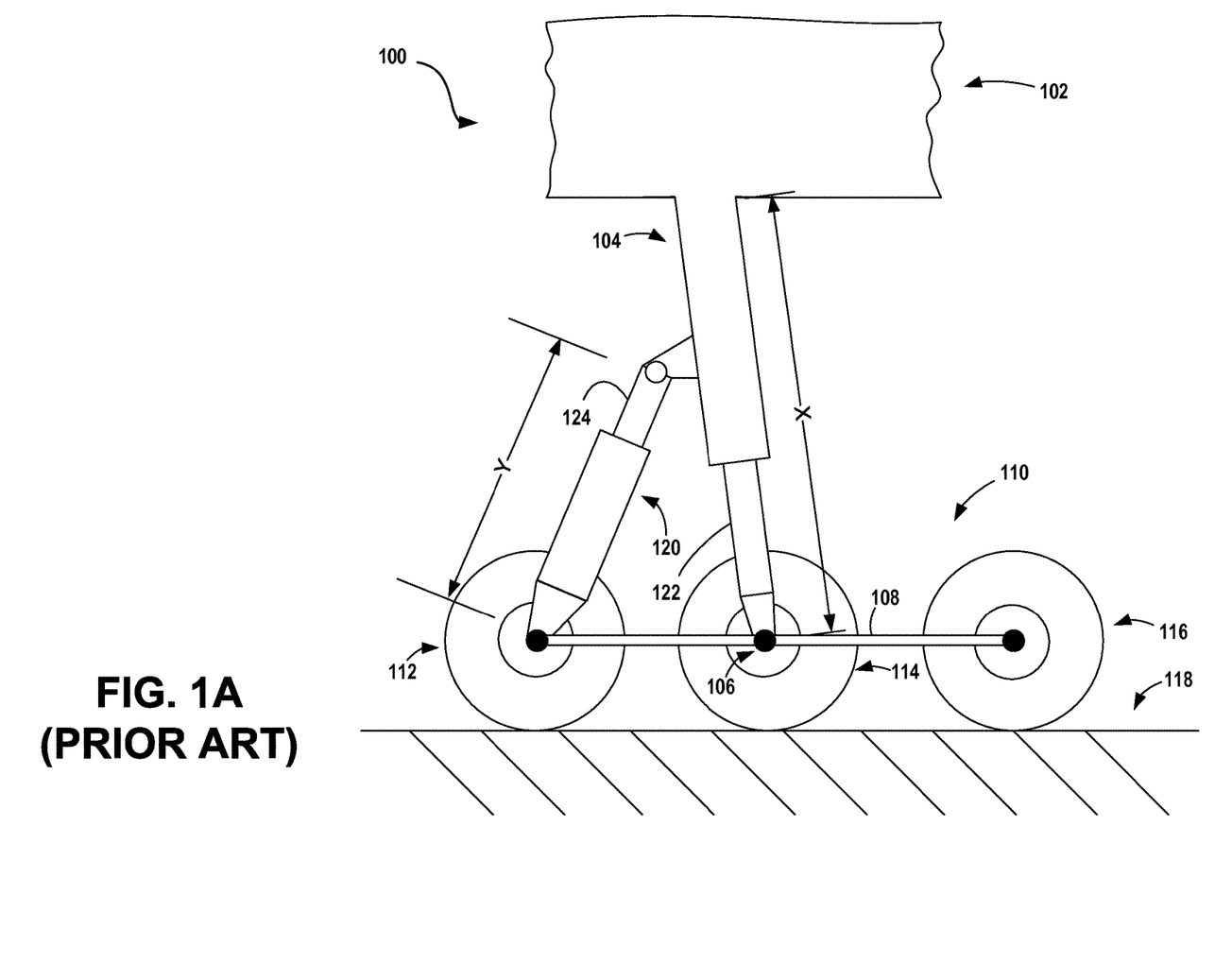
FIG. 1A is a prior art diagram illustrating a conventional semi-levered landing gear wheel truck during a taxi phase of operation.
Figure 1B:
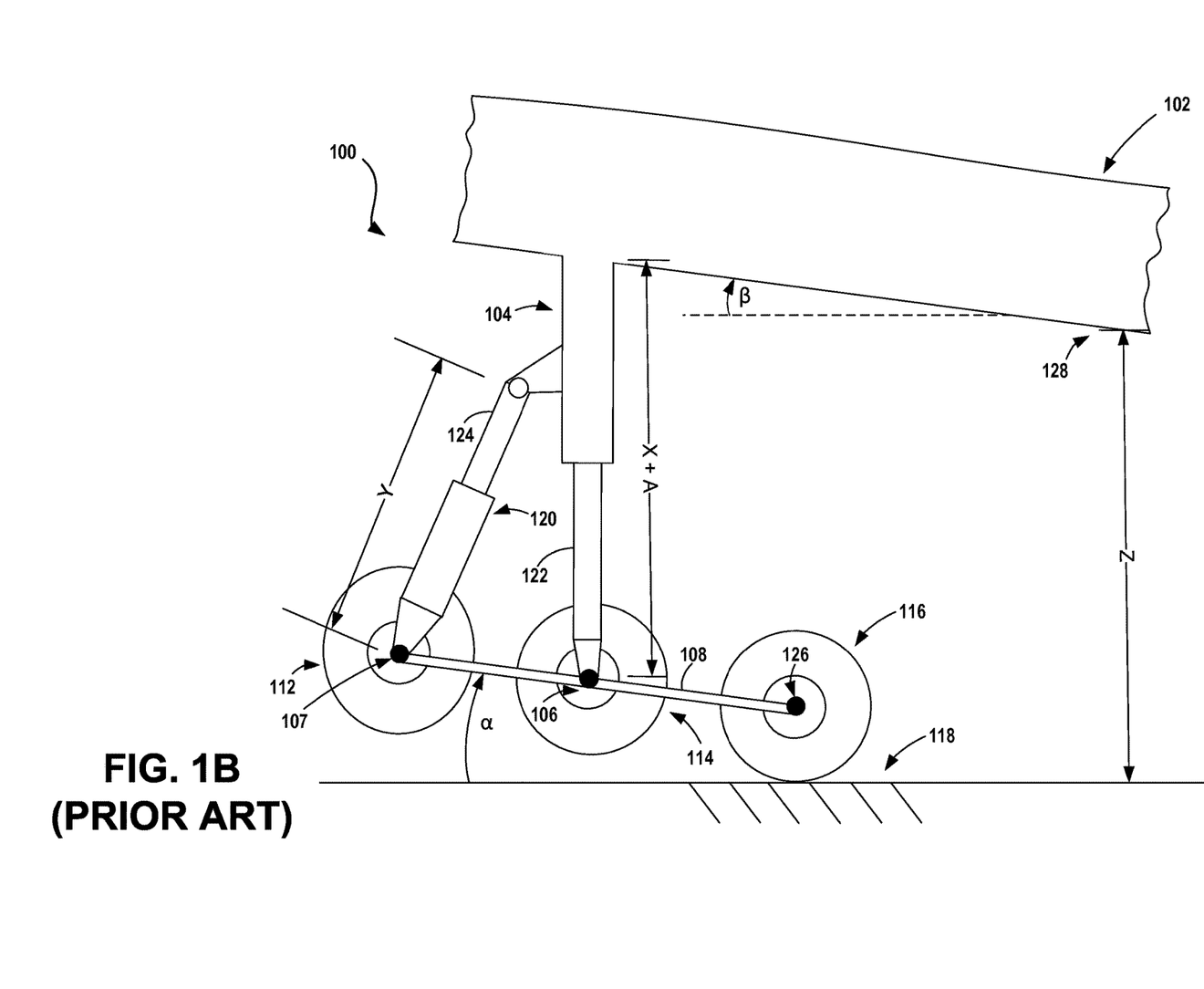
FIG. 1B is a prior art diagram illustrating a conventional semi-levered landing gear wheel truck during the takeoff rotation phase of operation.

The following detailed description is directed to an active semi-levered landing gear wheel truck for use in an aircraft to provide for an increased rotation angle during takeoff. It should be appreciated that the use of an oleo landing gear system is for illustrative purposes only and does not reflect an intent to limit the scope of the present disclosure to only oleo systems. As discussed briefly above, the height of the aircraft in relation to the ground affects the rotation angle achievable during takeoff. Limiting the rotation angle can affect the performance of the aircraft. In conventional landing gear systems, including conventional semi-levered landing gear systems, the configuration of the landing gear may limit the ability of the aircraft to achieve a desired rotation angle during liftoff. FIGS. 1A and 1B illustrate an exemplary implementation of a conventional SLG during a taxi and takeoff phase.

Shown in FIG. 1A is an SLG 100 for use with an aircraft 102. The SLG 100 is shown during a taxi phase of operation. The SLG 100 includes a main strut 104, which is an apparatus that is pivotally attached to a bogie beam 108 at a main pivot point 106. The bogie beam 108 is part of a wheel truck 110 that includes a forward set of wheels 112, a mid-set of wheels 114 and an aft set of wheels 116. In the configuration of FIG. 1, the SLG 100 has a rotation angle of zero degrees because the bogie beam 108 is parallel to the ground 118. The SLG 100 also includes an auxiliary strut 120 pivotally attached to the main strut 104 at one end of the auxiliary strut 120 and the bogie beam 108 at the other end.

The main strut 104 includes a main strut piston 122. The main strut piston 122 can be extended or retracted by changing a pressure in the main strut 104. The main strut 104 is shown having a length X. The auxiliary strut 120 includes an auxiliary strut piston 124. The auxiliary strut piston 124 can be extended or retracted or held at a fixed length by changing a pressure in the auxiliary strut 120. The auxiliary strut 120 is shown having a length Y. During a taxi phase, the main strut 104 and the auxiliary strut 120 can be configured to provide an equal or near equal pressure between the front set of wheels 112 and the aft set of wheels 116. In this configuration, there is a minimal torque about the main pivot point 106. The pressure in the main strut 104 and the auxiliary strut 120 is changed during a takeoff phase of the aircraft 102 to provide for a semi-levered landing gear, described by way of example in FIG. 1B, below.

FIG. 1B shows the SLG 100 during a takeoff phase of the aircraft 102. As shown in FIG. 1B, an angle $\alpha$ of the ground 118 to the bogie beam 108 has been achieved. As illustrated in FIG. 1B, the front set of wheels 112 and the mid-set of wheels 114 have come off the ground 118 as the aircraft 102 rotates from a zero rotation angle, shown by way of example in FIG. 1A, to the angle $\beta$ shown in FIG. 1B. As used herein, the angle $\beta$ is the angle of the aircraft 102 with respect to the ground 118. In a typical semi-levered landing gear design, the length of the main strut 104 is increased and the auxiliary strut 120 is held constant. By way of illustration, the main strut 104 is shown having a length X+A representing an increase in length over the configuration illustrated in FIG. 1A.

In some configurations, the length of the main strut 104 is increased, as the auxiliary strut 120 is held constant. This causes the bogie beam 108 to pivot around a forward pivot point 107, which is the location where the auxiliary strut 120 joins the bogie beam 108, forcing the aft set of wheels 116 in a downward direction relative to the forward set of wheels 112. During aircraft rotation, the aircraft 102 will pivot at an auxiliary pivot point 126 rather than the main pivot point 106. The length of the main strut 104 and the length of the bogie beam 108 and the pivoting of the bogie beam 108 about the forward pivot point 107 provides for a ground clearance Z, measured from the portion of the aircraft under the fuselage tail section 128 and the ground 118. The ground clearance Z can be greater than what would be achievable using a landing gear assembly without the auxiliary pivot point 126.

In some situations, it may be desirable to increase the ground clearance from ground clearance Z to a greater amount, ground clearance Z'. For example, the aircraft 102 may be capable and designed to achieve a maximum angle $\beta'$, but due to actual conditions, the aircraft 102 can only achieve the angle $\beta$. There may be several reasons for this. For example, minimum ground clearance Z may occur during takeoff rotation when a portion of the aircraft weight is still supported by the main strut 104 and the length of the main strut 104 is not at the maximum.

Figure 2:
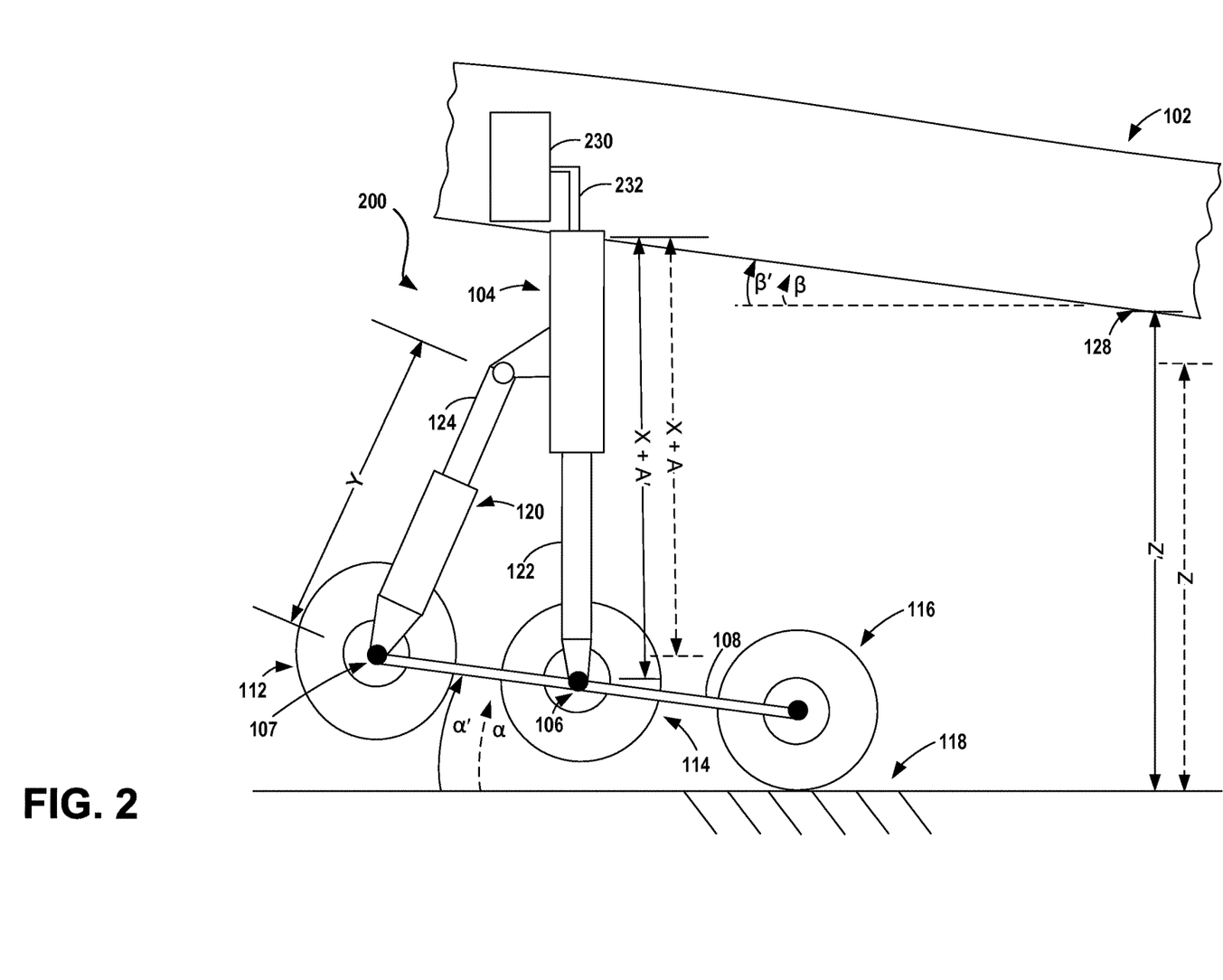
FIG. 2 is a diagram illustrating a semi-levered landing gear wheel truck using an active shock strut pressure boost system during the takeoff rotation phase of operation, according to embodiments presented herein.

FIG. 2 illustrates an active, SLG 200 in which an elevated-pressure source is used to achieve the ground clearance Z' during a takeoff phase of the aircraft 102. The ground clearance Z' can provide for the ability to achieve the angle $\beta'$. It should be understood that the disclosure provided herein may be described in terms of certain valve combinations, fluid conduits, and pressure transfer mechanisms. The present disclosure, however, is not limited to any particular configuration as other configurations may be used to perform various functions described herein. Any particular configuration is illustrative only and does not limit the disclosure to that one particular configuration.

According to various embodiments described herein, to provide for the ground clearance Z', the main strut 104 is extended from the length X+A, as illustrated in FIG. 1B, to an extended length X+A', as illustrated in FIG. 2 to provide for a longer main strut. The additional length of the main strut 104 can increase the ground clearance from the ground clearance Z of FIG. 1B to the ground distance Z' of FIG. 2 and an increased aircraft height above ground during a takeoff phase of operation.

To increase the length of the main strut 104 to a greater distance, a pressure boost mechanism 230 is used. The pressure boost mechanism 230 is an apparatus that is selectively coupled with the main strut 104 through a pressure line 232. Various valves and other mechanisms may be used to fluidically connect and disconnect the pressure boost mechanism 230 from the main strut 104. The pressure boost mechanism 230 is used as a source of pressure to increase the pressure in the main strut 104, causing the main strut 104 to be active during various phases of operation of the aircraft 102. The increase in pressure in the main strut 104 from the pressure boost mechanism 230 causes the main strut piston 122 to extend from the length X+A to the length X+A', as explained in more detail in FIG. 3 below.

Figure 3:
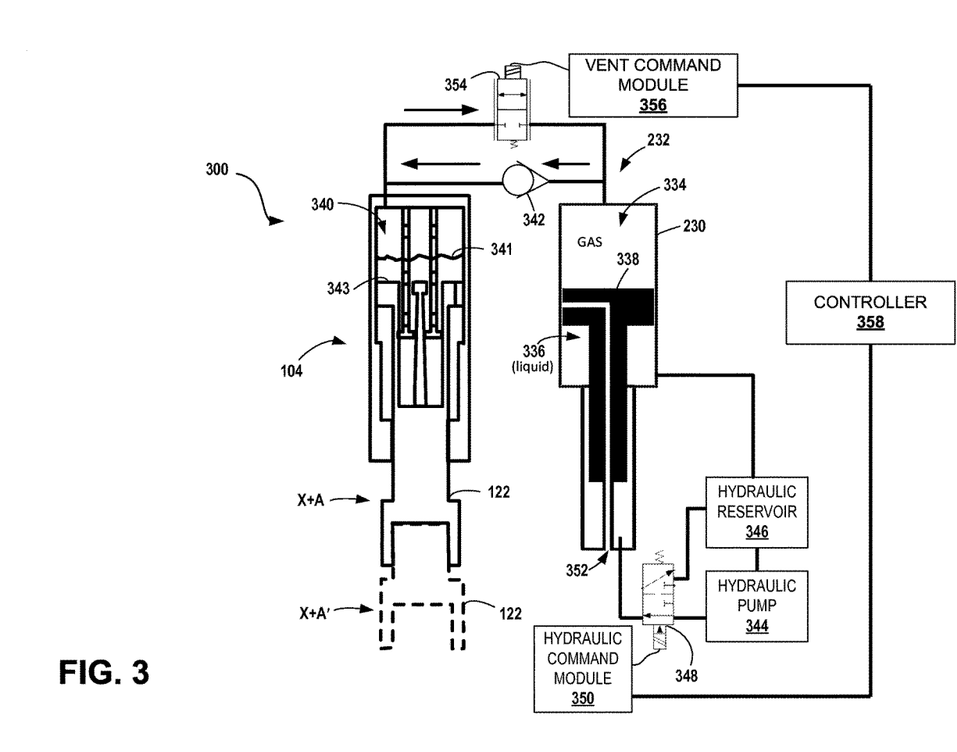
FIG. 3 is a system diagram of pressure apparatus used to provide an active pressure boost system for the shock strut of a landing gear system, according to embodiments presented herein.

FIG. 3 is a system diagram showing a pneumatic and hydraulic system 300 in accordance with various embodiments of the present disclosure. The system 300 includes the main strut 104 and the pressure boost mechanism 230. As discussed above with regard to FIG. 2, the pressure boost mechanism 230 is used to increase the pressure in the main strut 104, causing the main strut piston 122 to move from the length X+A to an extended length X+A'.

The pressure boost mechanism 230 includes a first fluid portion 334 and a second fluid portion 336. In the configuration described in FIG. 3, the fluid in the first fluid portion 334 can be a gas and the fluid in the second fluid portion 336 can be liquid. However, it should be understood that the presently disclosed subject matter is not limited to any particular liquid/gas configuration. In some implementations, the first fluid portion 334 includes nitrogen, air, combinations thereof, and the like. In further implementations, the second fluid portion 336 may include oil, water, combinations thereof, and the like. It should be appreciated that fluids other than liquids may be used in the second fluid portion 336 and fluids other than gases may be used in the first fluid portion 334. Further, it should be understood that the concepts described herein are not limited to any particular type of fluid, as some fluids may be compressible, as in the case of gases, or incompressible, as in the case of liquids. For example, the first fluid portion 334 may include oil and second fluid portion 336 may include high-pressure air. These and other combinations are considered to be within the scope of the present disclosure.

The pressure boost mechanism 230 further includes a piston 338 that fluidically separates the first fluid portion 334 from the second fluid portion 336, the structure of which defines the first fluid portion 334 and the second fluid portion 336. Due to the fluidic separation between the first fluid portion 334 and the second fluid portion 336, differences in pressure between the two can impart a motive force on the piston 338, which can cause the piston 338 to move away from the portion having the higher motive force and into the portion having a lower motive force. For example, if the motive force created by pressure in the second fluid portion 336 is greater than the motive force created by pressure in the first fluid portion 334, the force differential will cause the piston 338 to move and compress the first fluid portion 334. In a similar manner, if the motive force created by pressure in the second fluid portion 336 is lower than the motive force created by pressure in the first fluid portion 334, the force differential will cause the piston 338 to move and compress the second fluid portion 336.

The pressure boost mechanism 230 is used to increase the pressure in the main strut 104. The pressure in the pressure boost mechanism 230 is transferred to a main strut oleo-pneumatic chamber 340 through the pressure line 232. As mentioned briefly above, the use of an oleo chamber is for illustrative purposes only and does not reflect an intent to limit the scope of the subject matter disclosed herein to only oleo chambers. In some implementations, the main strut oleo-pneumatic chamber 340 includes both a gas and a liquid. A liquid surface 341 illustrates the phase separation between the gas and a liquid. It should be understood, however, that the fluid in the main strut oleo-pneumatic chamber 340 may be completely gas. The pressure line 232 fluidically connects the first fluid portion 334 to the main strut oleo-pneumatic chamber 340. In operation, when the pressure in the first fluid portion 334 is increased above the pressure in the main strut oleo-pneumatic chamber 340, a pressure differential is felt across a check valve 342, which causes the check value 342 to move to an open position, releasing the pressure from the first fluid portion 334 into the main strut oleo-pneumatic chamber 340. The check valve 342 will typically remain open while the pressure in the first fluid portion 334 is greater than the pressure in the main strut oleo-pneumatic chamber 340.

Once the pressure between the first fluid portion 334 and the main strut oleo-pneumatic chamber 340 is equal, or substantially the same, the check value 342 may move to a closed position, decoupling the pressure boost mechanism 230 from the main strut 104. It should be appreciated that the check valve 342 may include a biasing mechanism (not shown) that may cause the check valve 342 to close prior to an equalization of pressure. It should be understood that the present disclosure provided herein is not limited to any pressure differential necessary to close the check valve 342. The increase in pressure in the main strut oleo-pneumatic chamber 340 causes an increase in pressure to be felt at head 343 of the main strut piston 122. Thus, the main strut piston 122 is moved from the length X+A, which is the length prior to the increase in pressure in the main strut oleo-pneumatic chamber 340, to the length X+A', which is the length after the increase in pressure in the main strut oleo-pneumatic chamber 340.

To increase the pressure in the second fluid portion 336, hydraulic pump 344 is provided. The hydraulic pump 344 takes fluid from a hydraulic reservoir 346, increases the pressure through a pumping action, and pumps the high-pressure fluid into the second fluid portion 336. The hydraulic reservoir 346 may be a common reservoir used by various hydraulic loads or may be a special purpose reservoir for the system 300. A hydraulic bypass valve 348 can be used to allow or stop the flow of fluid out of the hydraulic pump 344 into the second fluid portion 336. In some configurations, this may selectively control the increase or decrease of pressure in the second fluid portion 336. The hydraulic bypass valve 348 can be any type of valve suitable for preventing or limiting the flow of fluid. In the implementation illustrated in FIG. 3, the hydraulic bypass valve 348 is a three-port electric solenoid valve controlled by hydraulic command module 350.

The hydraulic command module 350 may receive command from a controller 358 to position the hydraulic bypass valve 348. For example, during aircraft takeoff, the hydraulic command module 350 may receive an input to configure the hydraulic bypass valve 348 to allow fluid from the hydraulic pump 344 to enter the second fluid portion 336. After takeoff, the hydraulic command module 350 may receive an input to configure the hydraulic bypass valve 348 to allow fluid from the second fluid portion 336 to enter the hydraulic reservoir 346. It should be understood that although the controller 358 is illustrated as a single component, the concepts disclosed herein are not limited in such a manner. The controller 358 may include one or more controllers from various components in the aircraft 102. The controller 358 may be hardware, software, human, or combinations thereof.

Once the takeoff phase of the aircraft 102 has been completed, the SLG 200 may need to be reconfigured for landing mode. If the pressure in the main strut oleo-pneumatic chamber 340 is still at an increased pressure provided by the pressure boost mechanism 230, the main strut 104 may not be able to absorb the physical impact of landing, providing for a rough landing and possibly causing damage to the SLG 200 or other components of the aircraft.

Thus, to reduce the pressure in the main strut oleo-pneumatic chamber 340, in one implementation the pressure boost mechanism 230 is configured to provide a vent path to relieve the pressure in the main strut oleo-pneumatic chamber 340. As discussed above, the check valve 342 closes once the pressure in the pressure boost mechanism 230 is at or below the pressure in the main strut oleo-pneumatic chamber 340. To relieve the pressure, the hydraulic command module 350 causes the hydraulic bypass valve 348 to move to a position to direct fluid from the second fluid portion 336 into the hydraulic reservoir 346, which is at a lower pressure than the second fluid portion 336.

The venting of the fluid from the second fluid portion 336 into the hydraulic reservoir 346 may reduce the pressure in the second fluid portion 336. This may cause the piston 338 to move away from the first fluid portion 334 towards the second fluid portion 336, increasing the volume of the first fluid portion 334, thereby reducing the pressure in the first fluid portion 334.

An auxiliary vent 352 may be provided to aid in separation of fluids 336 and 334, thereby minimizing the risk of fluid 336 entering chambers of 334 and 340, and minimizing the risk of fluid 334 entering the chamber of 336. This may inhibit cross contamination of fluids.

The check valve 342 is designed to stop or limit the flow of fluid into the pressure boost mechanism 230 from the main strut oleo-pneumatic chamber 340 when the pressure in the main strut oleo-pneumatic chamber 340 is greater than the pressure in the pressure boost mechanism 230. This fluidically disconnects the main strut 104 from the pressure boost mechanism 230, allowing conventional operation of the main strut 104. However, it may be desirable or necessary to relieve the pressure in the main strut 104 through the pressure boost mechanism 230. Thus, in the configuration illustrated in FIG. 3 a vent valve 354 is provided.

The vent valve 354 may be a two-port electric solenoid valve controlled by vent command module 356. The vent valve 354 may be selectively opened to relieve the pressure in the main strut oleo-pneumatic chamber 340. The vent command module 356 may receive a command from the controller 358 to allow the pressure from the main strut 104 to be relieved. Thus, the vent command module 356 may provide an electrical signal to the vent valve 354 that, upon receipt of the electrical signal, causes the vent valve 354 to open. In this configuration, the pressure in the main strut oleo-pneumatic chamber 340 may be relieved through the vent valve 354 and into the first fluid portion 334. The pressure is then transferred to the second fluid portion 336 through the movement of the piston 338, and finally vented in the hydraulic reservoir 346. Once the venting process is complete, the vent command module 356 may provide an electrical signal to close the vent valve 354. Further, the hydraulic command module 350 may provide an electrical signal to the hydraulic bypass valve 348 to a neutral position.

FIGS. 4A-4D provide further operational description of the disclosure herein during various phases of aircraft operation. As discussed above, it may be desirable to increase the pressure in the main strut oleo-pneumatic chamber 340 during specific phases of aircraft operation, while allowing the main strut 104 to operate in a normal configuration during other operations. One example was provided above regarding a landing phase. During the landing phase, the pressure in the main strut 104 may be calibrated to absorb the forces imparted on the SLG 200 from the aircraft 102 touching down. If the pressure in the main strut 104 is above that calibrated amount, the main strut 104 may not absorb the forces at the degree intended, thus possibly causing damage to the aircraft 102 as well as providing an uncomfortable landing for passengers in the aircraft 102.

Figure 4A:
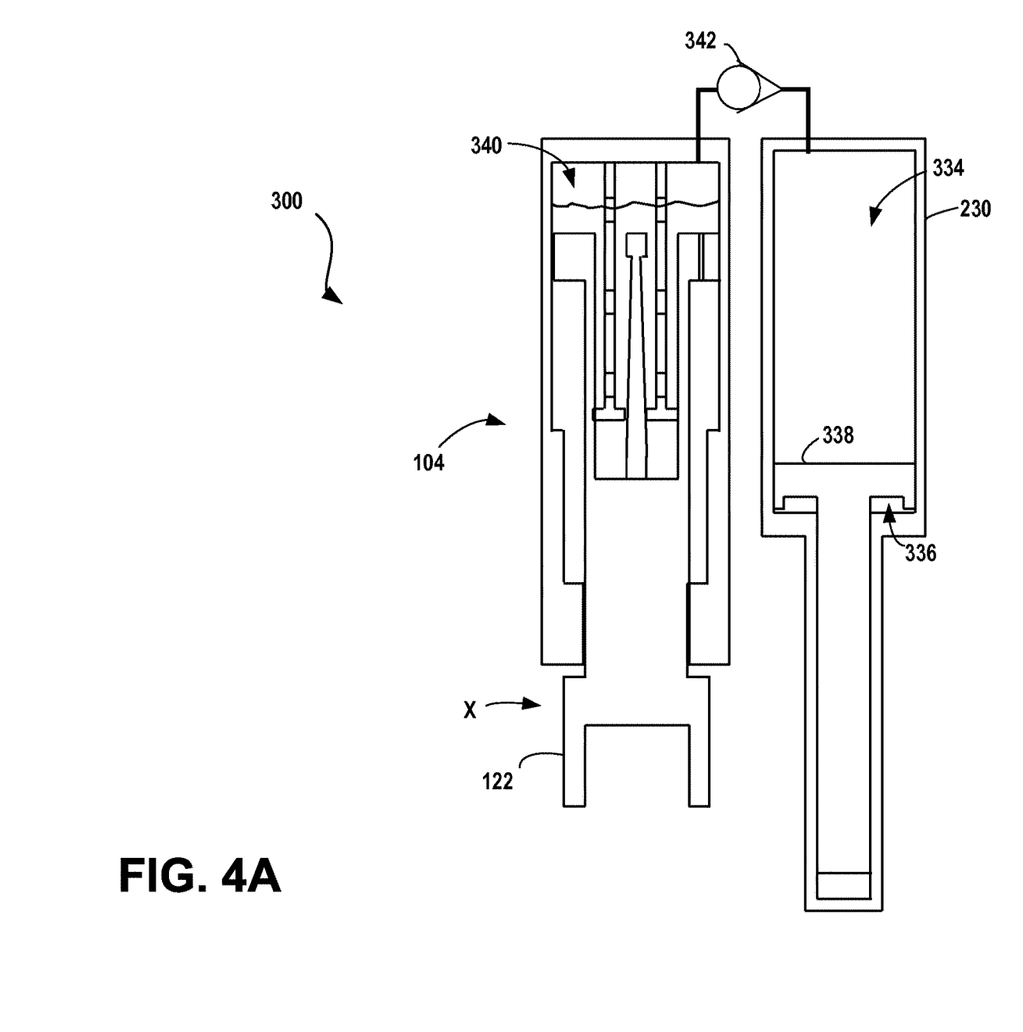
FIG. 4A is a system diagram showing an active shock strut pressure boost system during a taxi phase of operation, according to embodiments presented herein.

Turning to FIG. 4A, the SLG 200 is at an on-ground configuration. The aircraft 102 may be taxiing, sitting at a gate of an airport, moving along the ground, or another non-takeoff phase. In this phase, the main strut oleo-pneumatic chamber 340 is at a conventional configuration and pressure. The weight of the aircraft 102 is partially borne by the main strut 104, causing the main strut piston 122 to be at the length X. The pressure in the second fluid portion 336 is at a minimal or low level, as may be provided when the second fluid portion 336 is vented. The piston 338 is seated at the bottom of the pressure boost mechanism 230 due to the force of the pressure in the first fluid portion 334. Because the pressure boost mechanism 230 may be vented, the check valve 342 can be closed to prevent increases in pressure in the main strut oleo-pneumatic chamber 340 being transferred to the pressure boost mechanism 230. It should be understood that the position of various components in FIGS. 4A-4D may vary from the illustrations, and that the disclosure provided herein is not limited to any specific position.

Figure 4B:
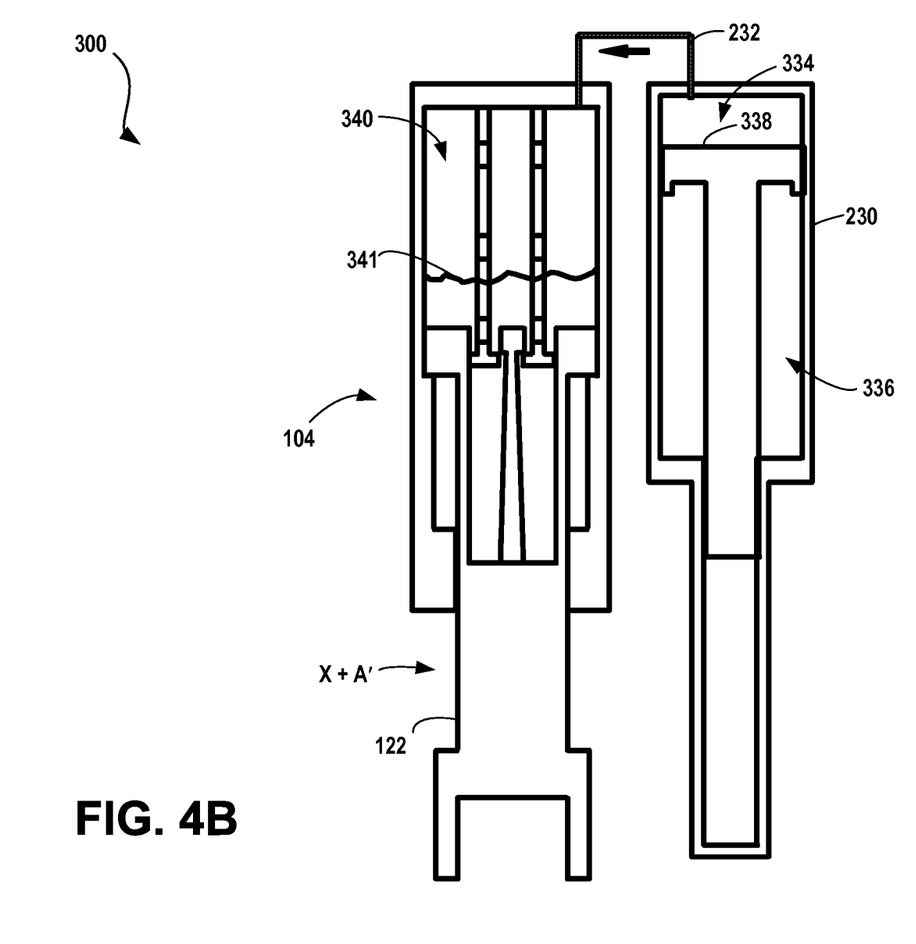
FIG. 4B is a system diagram showing an active shock strut pressure boost system during a takeoff phase of operation, according to embodiments presented herein.
Figure 4C:
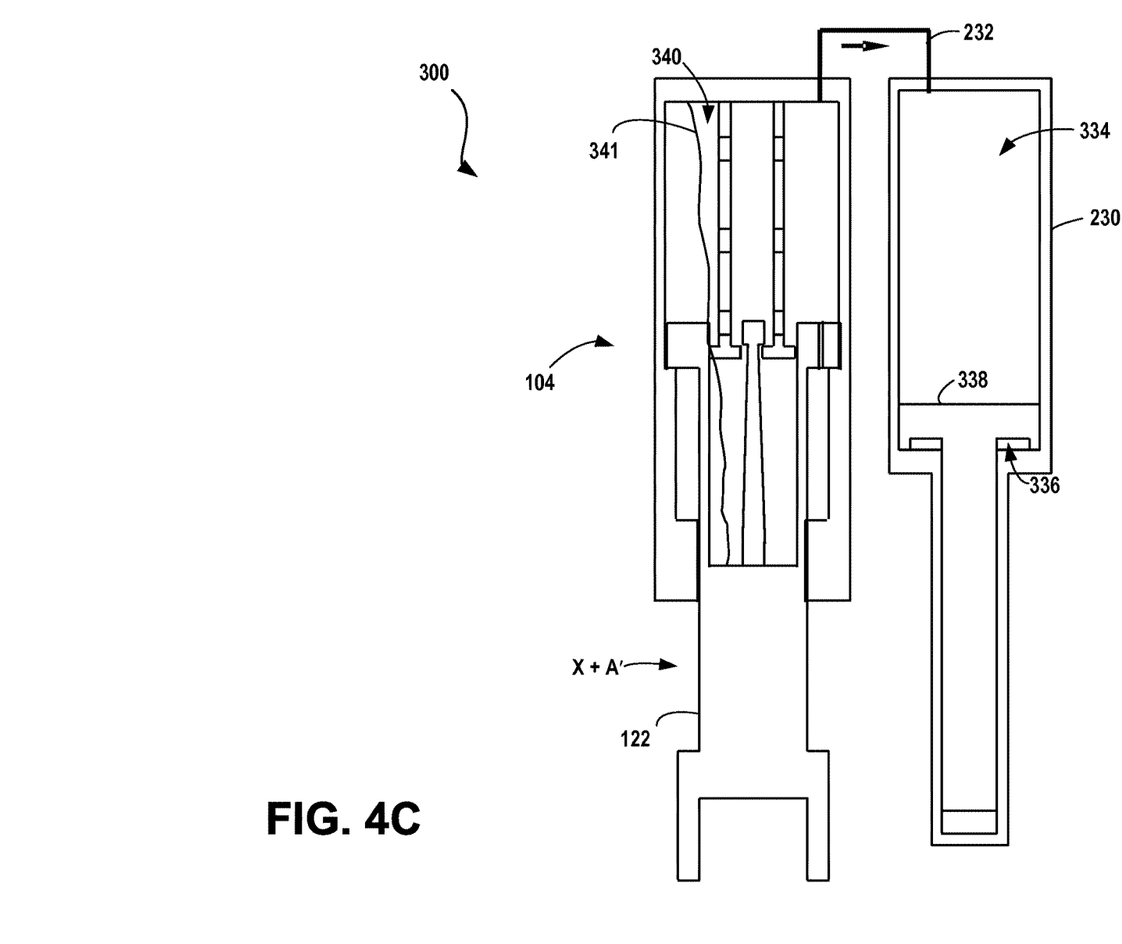
FIG. 4C is a system diagram showing an active shock strut pressure boost system during an inflight phase of operation, according to embodiments presented herein.

FIG. 4B illustrates the SLG 200 during a charging phase, which occurs during takeoff of the aircraft 102. As shown, the main strut piston 122 has moved from the length X illustrated in FIG. 4A to the length X+A' illustrated in FIG. 4B. The length X+A' correlates to a longer length than the length X+A illustrated in FIG. 1B and FIG. 3. To provide for the longer length, the main strut oleo-pneumatic chamber 340 has received a pressure increase from the pressure boost mechanism 230. The pressure in the second fluid portion 336 has been increased, causing a differential pressure between the second fluid portion 336 and the first fluid portion 334, which causes the piston 338 to move and compress the first fluid portion 334. The compression increases the pressure in the first fluid portion 334. This increase in pressure is transferred through 232 to the main strut oleo-pneumatic chamber 340, forcing the main strut piston 122 to move to the length X+A'.

Once the aircraft 102 has taken off, the SLG 200 is typically stowed into a bay in the undercarriage of the aircraft 102. The SLG 200 will usually be stowed in a near horizontal position in-line with the aircraft 102, thus causing the liquid surface 341 to move from a position illustrated in FIG. 4B to the position illustrated in FIG. 4C. While the aircraft 102 is in flight, it may be beneficial to relieve the pressure in the main strut oleo-pneumatic chamber 340. To relieve the pressure, the pressure in the second fluid portion 336 is reduced. The reduction in pressure in the second fluid portion 336 causes a differential pressure to be felt by the piston 338. This differential pressure forces the piston 338 down into the second fluid portion 336, thereby reducing the pressure in the first fluid portion 334. The pressure in the main strut oleo-pneumatic chamber 340 is relieved through the line 232 and into the pressure boost mechanism 230. The main strut piston 122 remains at length X+A' because the aircraft is not supported by the main strut 104 and the remaining pressure in fluid 340 forces main strut piston 122 to fully extend.

Figure 4D:
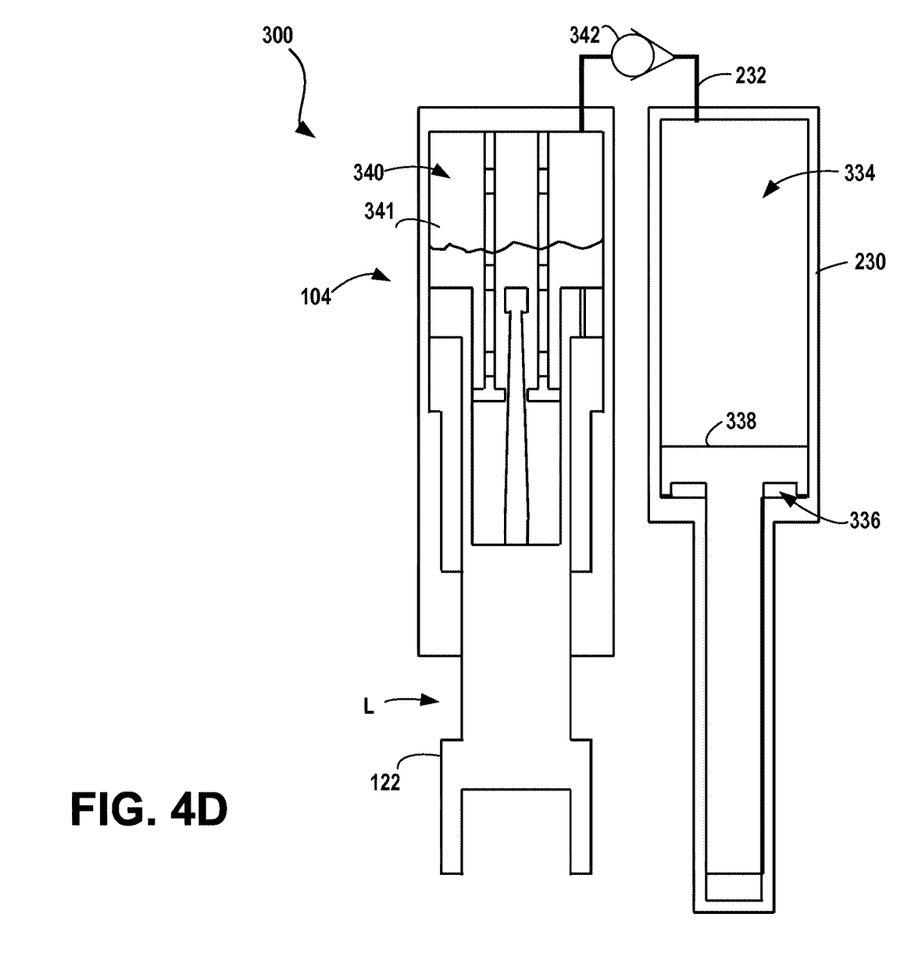
FIG. 4D is a system diagram showing an active shock strut pressure boost system during a landing phase of operation, according to embodiments presented herein.

FIG. 4D illustrates the SLG 200 during a landing phase. During landing, the main strut piston 122 is compressed to length L as it supports the aircraft and pressure of fluid in chamber 340 is increased. The check valve 342 can prevent the transfer of the pressurization in the main strut oleo-pneumatic chamber 340 into the pressure boost mechanism 230. The pressure boost mechanism 230 is shown in non-active state.

Figure 5:
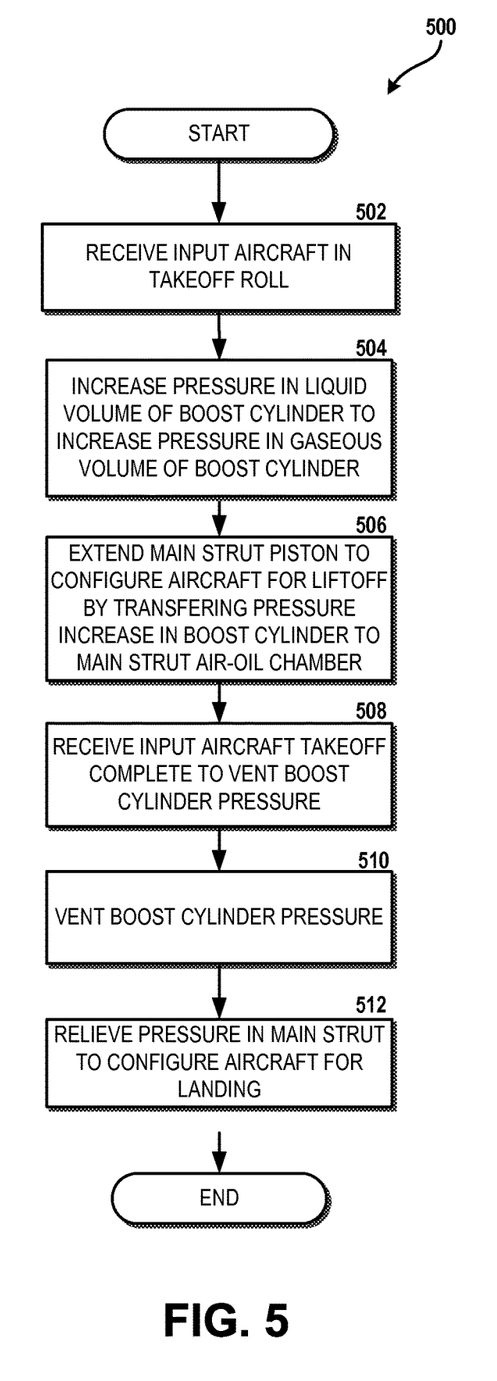
FIG. 5 is an exemplary method for using an active SLG, according to embodiments presented herein.

Turning now to FIG. 5, an illustrative routine for providing an active semi-levered landing gear system is described in detail. Unless otherwise indicated, it should be appreciated that more or fewer operations may be performed than shown in the figures and described herein. Additionally, unless otherwise indicated, these operations may also be performed in a different order than those described herein Routine 500 begins at operation 502, where an input is received at the SLG 200 that the aircraft 102 is beginning a takeoff roll phase. It should be appreciated that the technologies described herein may be used in various phases of the operation of the aircraft 102. Additionally, within the takeoff phase, the technologies described herein may be used at various times during the takeoff phase. Any description delineating any specific time is merely illustrative and does not limit the present disclosure to that specific time.

In one implementation, when the input is received that the aircraft 102 is in a takeoff roll phase, the hydraulic command module 350 sends a signal to the hydraulic bypass valve 348 to allow high-pressure liquid to enter the second fluid portion 336 of the pressure boost mechanism 230. The high-pressure liquid can come from various sources, including by way of example and not by way of limitation, the hydraulic pump 344. In some implementations, the length of the auxiliary strut piston 124 is maintained during the takeoff roll phase.

From operation 502, the routine 500 proceeds to operation 504, where the increase in pressure in the second fluid portion 336 of the pressure boost mechanism 230 increases the pressure in the first fluid portion 334 of the pressure boost mechanism 230. Illustrated by way of example and not by way of limitation in FIGS. 3 and 4B, increasing the pressure in the second fluid portion 336 pushes the piston 338 against the gas in the first fluid portion 334, increasing the pressure in the first fluid portion 334. As mentioned previously, the present disclosure is not limited to any particular fluid configuration, as the first fluid portion 334 or the second fluid portion 336 may include a gas or liquid. Further, it should be understood that, as with other operations, operation 504 may occur before operation 502.

From operation 504, the routine 500 proceeds to operation 506, where the main strut piston 122 is extended to configure the aircraft 102 for liftoff by transferring the pressure increase in the first fluid portion 334 of the pressure boost mechanism 230 to the main strut oleo-pneumatic chamber 340. Further illustrated by way of example and not by way of limitation in FIGS. 3 and 4B, once the pressure in the first fluid portion 334 is greater than the pressure in the main strut oleo-pneumatic chamber 340, the check valve 342 opens, allowing the pressure in the first fluid portion 334 to be fluidically transferred to the main strut oleo-pneumatic chamber 340. The pressure increase in the main strut oleo-pneumatic chamber 340 increases the pressure on the main strut piston 122, forcing the main strut piston 122 to the X+A' location.

From operation 506, the routine 500 proceeds to operation 508, where an input is received that the aircraft has completed the takeoff operation. The input may come from various sources, the present disclosure of which is not limit to any particular source. The takeoff complete notification may be used to reconfigure the main strut 508 for flight and for an eventual landing.

From operation 508, the routine 500 proceeds to operation 510, where the boost mechanism pressure is vented. In one implementation, operations 508 and 510 are the beginning phases of venting the main strut 340. Illustrated by way of example and not by way of limitation in FIGS. 3 and 4C, the hydraulic command module 350 transmits a command to the hydraulic bypass valve 348 to reposition the valve to remove the source of high-pressure and to vent the second fluid portion 336 into the hydraulic reservoir 346. This relieves the pressure in the second fluid portion 336, allowing the pressure in the first fluid portion 334 to force the piston 338 downward to reduce pressure in the first fluid portion 334.

From operation 510, the routine proceeds to operation 512, where the pressure in the main strut is relieved to configure aircraft 102 for landing. The pressure in the auxiliary strut 120 is also reduced to allow compression or extension of the auxiliary strut during landing. Illustrated by way of example and not by way of limitation in FIGS. 3, 4C and 4D, vent command module 356 transmits an electronic command to the vent valve 354 to allow the pressure in the main strut oleo-pneumatic chamber 340 to be fluidically transferred to the first fluid portion 334 of the pressure boost mechanism 230. The increase in pressure in the first fluid portion 334 forces the piston 338 down into the second fluid portion 336, relieving the pressure in the main strut oleo-pneumatic chamber 340. The reduction in the pressure in the main strut oleo-pneumatic chamber 340 allows the main strut 104 to be configured for a conventional landing. Further, it should be understood that, as with other operations, operation 508 may occur before operation 510. The routine 500 thereafter ends.

The subject matter described above is provided by way of illustration only and should not be construed as limiting. Various modifications and changes may be made to the subject matter described herein without following the example embodiments and applications illustrated and described, and without departing from the true spirit and scope of the present subject matter, embodiments of which are set forth in the following claims.

What is claimed is:

1. An active semi-levered landing gear for use in an aircraft, the landing gear configured to reduce risk of tail strikes of the aircraft during takeoff; the landing gear comprising:
   a main strut attached to a bogie beam, the main strut comprising a main strut oleo-pneumatic chamber having a chamber pressure and a main strut piston, and
   a pressure boost mechanism comprising a first fluid portion having a first fluid portion pressure, and a second fluid portion having a second fluid portion pressure and fluidically separated from the first fluid portion, wherein the first fluid portion is selectively coupled with the main strut oleo-pneumatic chamber, wherein an increase in the second fluid portion pressure increases the first fluid portion pressure, and wherein the increase in the first fluid portion pressure increases the chamber pressure to extend a length of the main strut piston to provide a longer main strut and an increased aircraft height above ground during a takeoff phase of operation.

2. The active semi-levered landing gear of claim 1, further comprising a check valve configured to be in an open position when the first fluid portion pressure is greater than the chamber pressure and in a closed position when the first fluid portion pressure is less than the chamber pressure.

3. The active semi-levered landing gear of claim 1, further comprising a high pressure source to increase the second fluid portion pressure.

4. The active semi-levered landing gear of claim 1, further comprising a common hydraulic reservoir to receive and provide a fluid to the second fluid portion.

5. The active semi-levered landing gear of claim 1, wherein the first fluid portion comprises a gas and the second fluid portion comprises a liquid.

6. The active semi-levered landing gear of claim 1, further comprising a vent valve configured to selectively open and relieve the chamber pressure into the pressure boost mechanism to reduce the chamber pressure.

7. The active semi-levered landing gear of claim 6, wherein the vent valve is configured to open and close upon receipt of command from a controller.

8. The active semi-levered landing gear of claim 1, wherein the pressure boost mechanism further comprises a piston disposed between the first fluid portion and the second fluid portion that fluidically separates the first fluid portion from the second fluid portion.

9. The active semi-levered landing gear of claim 8, wherein the piston comprises a vent configured to reduce cross contamination of the first fluid and the second fluid across the piston.

10. The active semi-levered landing gear of claim 1, further comprising a hydraulic bypass valve configured to selectively control the increase or decrease of second fluid portion pressure.

11. The active semi-levered landing gear of claim 10, wherein the hydraulic bypass valve is configured to open and close upon receipt of a command from a controller.

12. A method of extending a main strut piston of an active semi-levered landing gear of an aircraft for takeoff, the method comprising:

providing a pressure boost mechanism to include a first fluid portion and a second fluid portion, fluidically separating the first fluid portion from the second fluid portion, providing a main strut oleo-pneumatic chamber configured for fluid communication with the pressure boost mechanism, receiving an input that the aircraft is in a takeoff roll phase, increasing a pressure in the first fluid portion by increasing a pressure in the second fluid portion, and moving the main strut piston to an extended position by fluidically transferring the increase in pressure in the first fluid portion to the main strut oleo-pneumatic chamber.

13. The method of claim 12, further comprising maintaining the length of an auxiliary strut during the takeoff roll phase.

14. The method of claim 12, wherein the increase of the pressure in the first fluid portion is provided by the pressure in the second fluid portion forcing a piston into the first fluid portion to compress a fluid in the first fluid portion.

15. The method of claim 12, wherein increasing the pressure in the second fluid portion comprises allowing a high-pressure liquid to enter the second fluid portion.

16. The method of claim 15, wherein allowing a high-pressure liquid to enter the second fluid portion comprises opening of a hydraulic bypass valve to allow the high-pressure liquid to enter the second fluid portion.

17. The method of claim 12, further comprising:

receiving an input that the takeoff roll phase is complete, reducing the pressure in the main strut oleo-pneumatic chamber by reducing second fluid pressure and allowing boost cylinder piston to retract, and retracting an auxiliary strut.

18. The method of claim 17, wherein retracting the boost cylinder piston by reducing the pressure in the second fluid chamber comprises:

opening a valve to vent the pressure in the second fluid portion to reduce the pressure in the first fluid portion, and opening the vent valve to fluidically transfer the pressure in the main strut oleo-pneumatic chamber through the vent valve into the first fluid portion.

19. A pressure boost system for a semi-levered landing gear of an aircraft, the pressure boost system configured to reduce risk of tail strikes of the aircraft during takeoff, the pressure boost system comprising:

a main strut apparatus including a main strut oleo-pneumatic chamber and a main strut piston, a pressure boost mechanism selectively coupled to the main strut oleo-pneumatic chamber, the pressure boost mechanism comprising a first fluid portion and a second fluid portion fluidically separated from the first fluid portion, and a controller for selectively coupling the main strut apparatus to the pressure boost mechanism, wherein when the pressure boost mechanism is coupled to the main strut oleo-pneumatic chamber during a takeoff phase of operation, an increase in a pressure in the second fluid portion causes an increase in pressure in the first fluid portion and the main strut oleo-pneumatic chamber, forcing the main strut piston to extend, wherein when the pressure boost mechanism is decoupled from the main strut oleo-pneumatic chamber and a vent valve is opened after the takeoff phase, a decrease in pressure in the second fluid portion causes a decrease in pressure in the first fluid portion and the main strut oleo-pneumatic chamber.

20. The pressure boost system of claim 19, further comprising:

a hydraulic pump to provide a high-pressure source of a liquid to increase the pressure in the second fluid portion, a hydraulic reservoir to receive the liquid when the second fluid portion is vented, a hydraulic bypass valve controlled by the controller and having a first position to allow the high-pressure source of the liquid to enter the second fluid portion and a second position to direct the liquid to the hydraulic reservoir when the second fluid portion is vented; and a vent valve controlled by the controller and having a position to allow a main strut pressure relief to the pressure boost mechanism.

* * * * *